United States Patent [19]
Koe

[11] Patent Number: 5,934,004
[45] Date of Patent: Aug. 10, 1999

[54] FISHING DEVICE SUPPORT

[76] Inventor: Frank T. Koe, 25 E. 92nd St., New York, N.Y. 10128

[21] Appl. No.: 08/969,697

[22] Filed: Nov. 13, 1997

Related U.S. Application Data

[63] Continuation of application No. 08/605,935, Feb. 23, 1996, abandoned.

[51] Int. Cl.⁶ ..................................................... A01K 97/10
[52] U.S. Cl. ........................................... 43/21.2; D22/147
[58] Field of Search ............................. 43/21.2; 248/530, 248/532, 533; D22/147, 148

[56] References Cited

U.S. PATENT DOCUMENTS

| D. 125,767 | 3/1941 | Hilts | D22/147 |
|---|---|---|---|
| D. 221,279 | 7/1971 | Erickson | D22/147 |
| 3,115,722 | 12/1963 | Mann | 43/21.2 |
| 3,385,544 | 5/1968 | Barnett | 43/21.2 |
| 4,479,628 | 10/1984 | Albright | 43/21.2 |
| 5,349,775 | 9/1994 | Mondares | 43/21.2 |
| 5,365,689 | 11/1994 | Holliman | 43/21.2 |

OTHER PUBLICATIONS

Gander Mountain catalog (Spring/Summer 1995), p. 32.

Primary Examiner—Kurt Rowan
Attorney, Agent, or Firm—Finnegan, Henderson, Farabow, Garrett, and Dunner, L.L.P.

[57] ABSTRACT

A fishing device is provided for holding a distal end of a fishing rod above the surface of a body of water while also having a member for attaching a string of previously caught fish. The fishing device also has marks with which the caught fish can be measured.

4 Claims, 4 Drawing Sheets

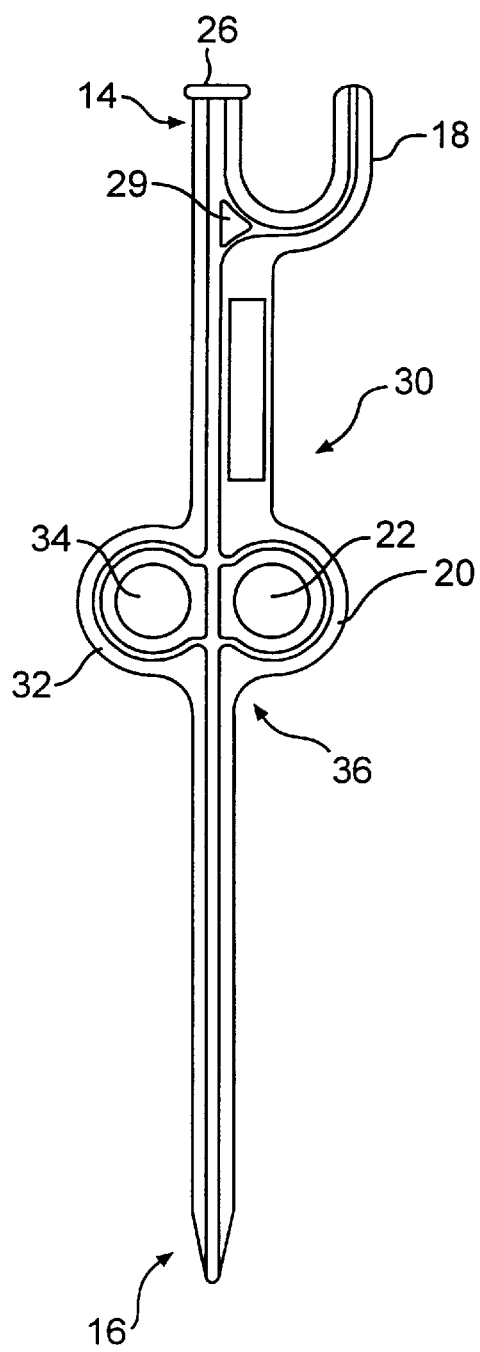
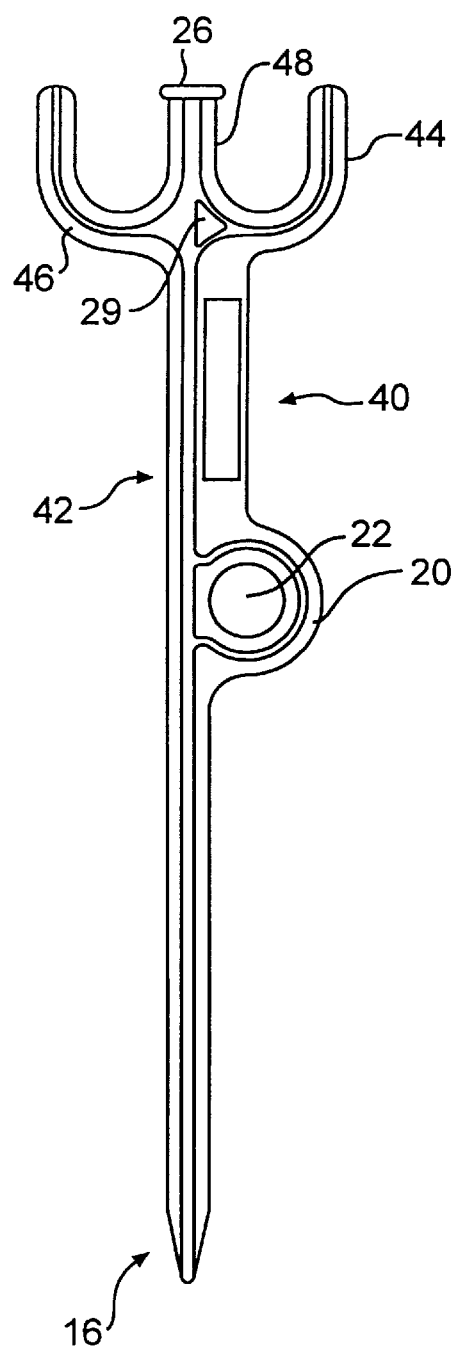
FIG. 3
FIG. 4

FISHING DEVICE SUPPORT

This application is a continuation of application Ser. No. 08/605,935, filed Feb. 23, 1996, now abandoned.

BACKGROUND OF THE INVENTION

1. Field of the Invention

The present invention relates to a fishing device and more particularly to a fishing device for use near a shoreline.

2. Description of the Prior Art

Most fishing rod holders in use today are devised in a way that enables them to be attached to boats or docks. One proposed shore-type fishing rod holder consists of a PVC pipe that is cut on an angle to create a point, which allows it to be pressed into the sand to hold a surf fishing rod.

However, freshwater shore fishermen have not had many options for holding their fishing rods or fishing poles, despite wanting to rest their rod or rods on the ground while they relax, eat, search for tackle, or wait for a fish to bite. Laying the rod on the ground, however, is not practical. Therefore, in order to lay the rod down, a fisherman must be fortunate enough to find a tree branch or a stack of rocks that will allow the fisherman to rest his rod on it while the end of the rod remains above the water, thereby providing a clear view of the line entering the water so as to detect biting fish.

Also, the fisherman have had to either put their fish in separate container of water or cut a small limb or twig from a tree or fashion whatever they had at hand to secure to the shore a metal or nylon stringer with the fish caught during the day to keep the fish alive and fresh. Even if such a branch were found that could be used for either or both of these two purposes, the fisherman would still need a ruler or tape measure readily available to determine the length of the fish so he could return illegally sized fish to the water without injury.

In light of the foregoing, there is a need for a fishing device which will hold at least one fishing rod above the surface of the water while securing a stringer of fish and allowing the fisherman to measure the fish.

SUMMARY OF THE INVENTION

Accordingly, it is an object of the invention to provide a fishing device for supporting at least one fishing rod or fishing pole and for attaching a stringer of fish.

It is also an object of the invention to provide a fishing device for supporting at least one fishing rod, for attaching a stringer of fish, and for measuring the length of a fish.

Additional objects and advantages of the invention will be set forth in the description which follows, and in part will be apparent from the description or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, the present invention provides for a fishing device comprising an elongated member having a top end and a bottom end, means disposed at the top end of the elongated member for supporting at least one fishing rod, and means disposed intermediate the bottom end and top end of the elongated member for attaching a string of fish.

To further achieve the foregoing objects, the invention provides for a fishing device for use near a shore of body of water comprising an elongated member having a bottom portion for inserting into the ground near the shoreline a distance sufficient to maintain the member substantially upright, said member having a top portion extending above the ground when the elongated member is inserted said sufficient distance, a support mounted to the top portion for supporting a distal end of a fishing rod higher than the surface of the body of water, and means positioned intermediate the support and the bottom portion for securing one or more previously caught fish.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 3 is a frontal view of a second embodiment of a fishing device in accordance with the present invention.

FIG. 4 is a frontal view of a third embodiment of a fishing device in accordance with the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention includes an elongated member having a top end and a bottom end with means disposed at the top end of the elongated member for supporting at least one fishing rod or fishing pole. The elongated member is also provided with means between the support and the bottom of the elongated member for securing one or more previously caught fish.

Figure 1:
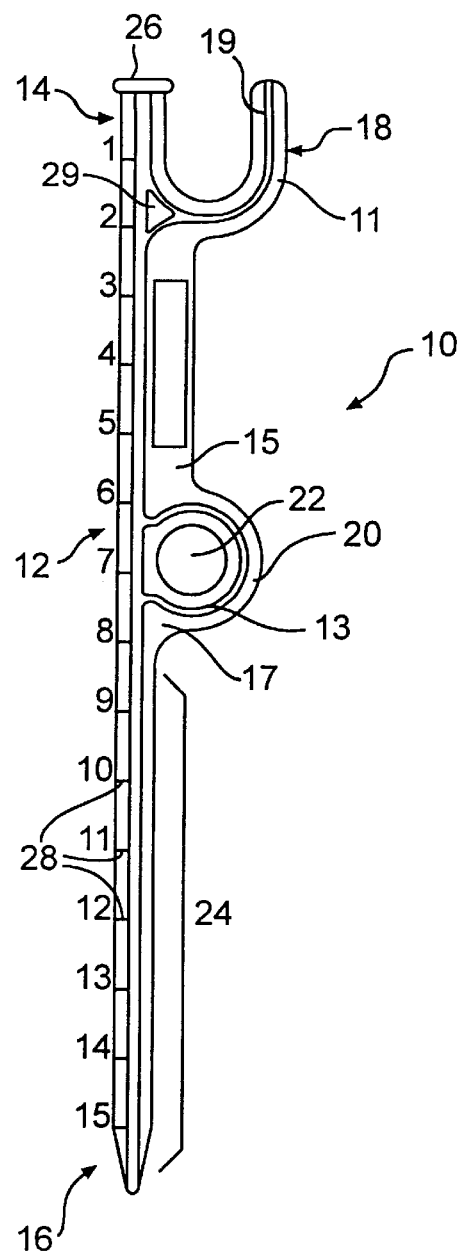
FIG. 1 is a frontal view of a first embodiment of a fishing device in accordance with the present invention.

As embodied herein, FIG. 1 illustrates a first embodiment of a fishing device 10 made in accordance with the present invention. Fishing device 10 includes an elongated stake portion 12, a top end 14, and a bottom end 16. Attached at the top end 14 of the elongated stake 12 is fishing rod or fishing pole support 18 of U-shaped configuration for holding a distal end of a fishing rod (not shown) above a surface of a body of water (not shown). The U-shaped fishing pole support 18 includes one leg defined by the top end 14 of the stake 12 and a second leg 19 spaced from the top end of the stake and located at or below the capped top end of the stake. The fishing device 10 is inserted into the ground (not shown) near a shoreline a sufficient distance to maintain the fishing device 10 in an upright position and to prevent previously caught fish hooked on a stringer (not shown) which is attached to annular member 20 through hole 22 from swimming away. The distance that fishing device 10 may be inserted into the ground may correspond to the entirety of bottom portion 24 or just a part thereof. Additionally, depending upon the exact location of the fishing device in relation to the shoreline and the slope of the land or surrounding area, the annular member 20 may be either above or below the surface of the water. The depth of insertion of fishing device 10 may also depend upon a fisherman's own preference for the location of the annular member 20, the height of the fishing rod support 18 relative to the surface of the water, or the elevation of the fish rod.

Fishing device 10 may be easily pushed into the ground because of the pointed bottom end 16. However, if the ground is rocky, hard, etc., cap 26 provides a surface to be used to assist in inserting the fishing device 10 into the ground the required distance.

Also provided on elongated member 12 are marks 28 for measuring any fish caught by the fisherman. The embodiment shown in FIG. 1 illustrates the marks 28 measured in inches. The marks 28 may be measured out in centimeters or any other appropriate units. The measuring marks 28 in the most preferred embodiment are raised marks in the form of a hyphen (-) with raised numbers. The measuring marks 28 may also be indentations or even small holes in the elongated member 12. However, the raised marks and numbers work best since they are easily seen, do not fill with mud, dirt, etc., and can be easily wiped off.

The most preferred embodiment of fishing device 10 is about 16 inches long and about 2.25 inches wide. These dimensions allow for the fishing device 10 to be inserted into the fisherman's tackle box with relative ease while still having sufficient length to hold a fishing rod above the water, hold a stringer of fish, measure the fish, and be inserted into the ground a distance sufficient to remain upright. However, other dimensions may be used which allow the fishing device to fit inside tackle boxes. Additionally, the annular member 20 and the fishing rod support 18 are on the same plane (not shown) which also allows for easy storage in a fishing tackle box. It should be noted that the support 18 and annular member 20 may be in the same plane, but on opposite sides of the elongated member 12 (not shown). Fishing device 10 is also preferably made of a light weight plastic such as ABS plastic. Other types of plastic and even other materials, provided the material is strong and light weight (e.g., metal), may also be used to make fishing device 10.

Fishing device 10 also has an opening 29 located between the elongated portion 12 and the fishing rod holder 18 for hanging on a nail or hook in the fisherman's garage, etc. when not in use.

Figure 2:
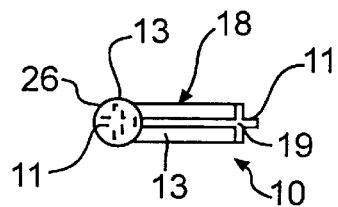
FIG. 2 is a top view of the fishing device of FIG. 1.

FIG. 2 is a top view of fishing device 10. As may be seen in FIGS. 1 and 2, the elongated stake portion 12, the fishing rod support 18, and the annular member lie in a common plane (i.e., the plane of the drawing sheet) and are formed of two perpendicular flanges 11 and 13. Flange 13, in FIG. 1, extends perpendicular to the common plane of the sheet. FIG. 2 also shows the two flanges. Between the fishing rod support 18 and the annular member 20, and between the annular member and a portion of the stake 12, flange 11 forms web portions 15 and 17, respectively. As shown in FIG. 1, web portion 15 extends fully along that portion of the stake 12 between the fishing rod support 18 and the annular member 20 and has a greater width in the common plane than a remaining portion of flange 11 for added rigidity of the fishing pole support and the annular member.

FIG. 3 illustrates a second embodiment of fishing device 30 having two annular members 20 and 32 respectively with their respective openings 22 and 34. Although not shown on the embodiment of FIG. 3, the measuring marks of the first embodiment of FIG. 1 (element 28) may also be included along the elongated member 36.

FIG. 4 shows a third embodiment of the fishing device 40 according to the present invention. This embodiment is substantially similar to the embodiment of FIG. 1, but fishing device 40 has two fishing rod holders 44 and 46, a holder being disposed on each side of elongated member 42.

While not shown in FIG. 4, the top portion 48 of elongated member 42 may be removed to provide a single, wide fishing rod holder. Alternatively, a second annular member may be attached to elongated member 52, opposite annular member 20, to provide two locations for attaching a string of previously caught fish, as shown in FIG. 3.

Figure 5:
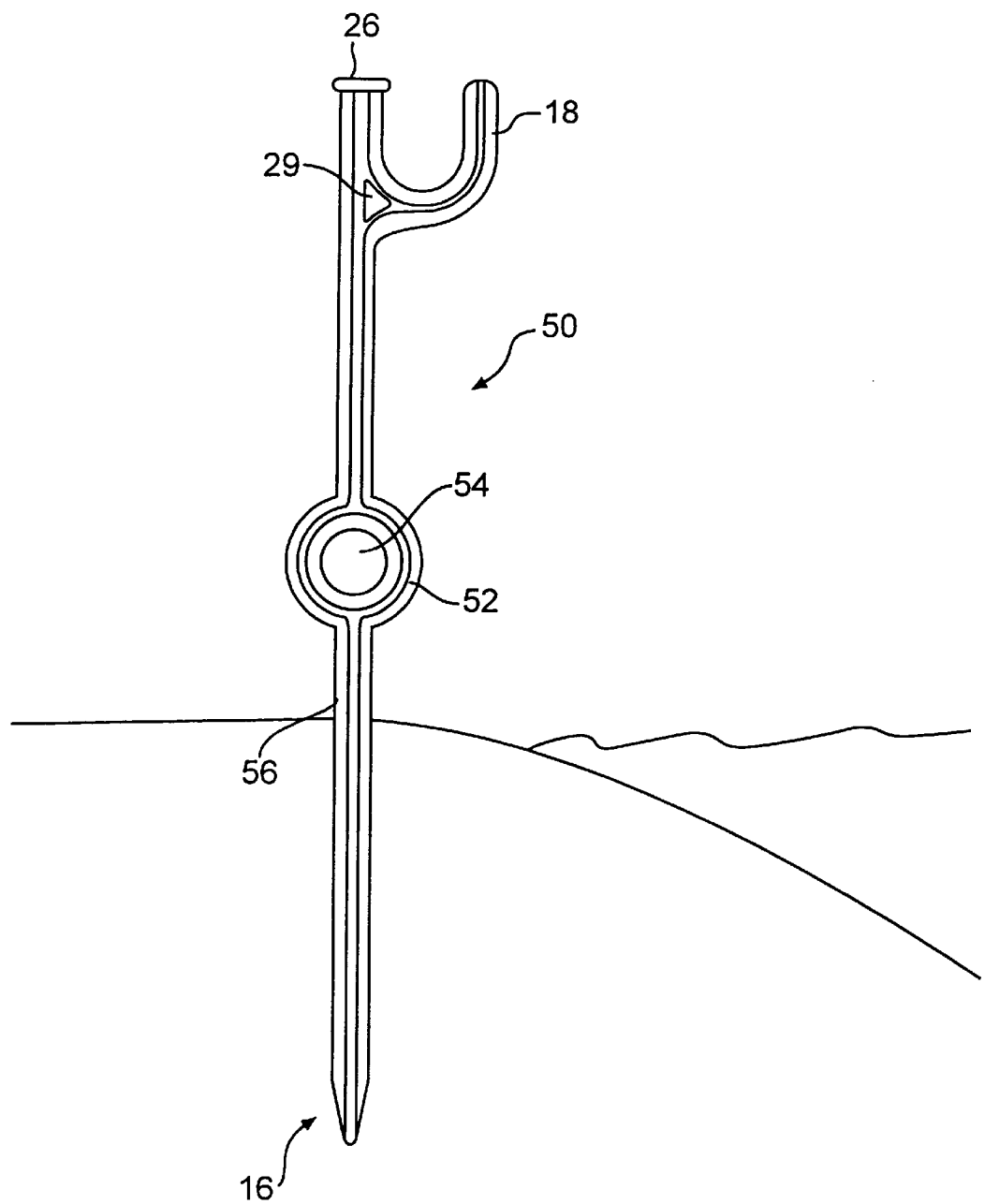
FIG. 5 is a frontal view of a fourth embodiment of a fishing device in accordance with the present invention illustrating one use near the shoreline.

FIG. 5 illustrates a fourth embodiment of fishing device 50 in use near a shoreline. In this embodiment, annular member 52 having an opening 54 is located in the middle of elongated member 56. The measuring marks may also be placed on or in elongated member 56 to measure the length of fish as shown and described for the embodiment in FIG. 1. It should also be noted that a second fishing rod holder may be attached to the elongated member 56, opposite fishing rod holder 18, similar to fishing rod holders 44 and 46 shown in FIG. 4. As shown in FIG. 5, the fishing device 50 may be inserted into the ground near the shoreline, but not in the water. While the fishing rod holder 18 is rotated with respect to the shoreline in this figure, it is understood that the orientation of the fishing rod holder 18 may be oriented in any direction, depending on the preferences of the fisherman. The fishing device 50 may also be inserted into the ground under the water as shown in FIG. 6.

Figure 6:
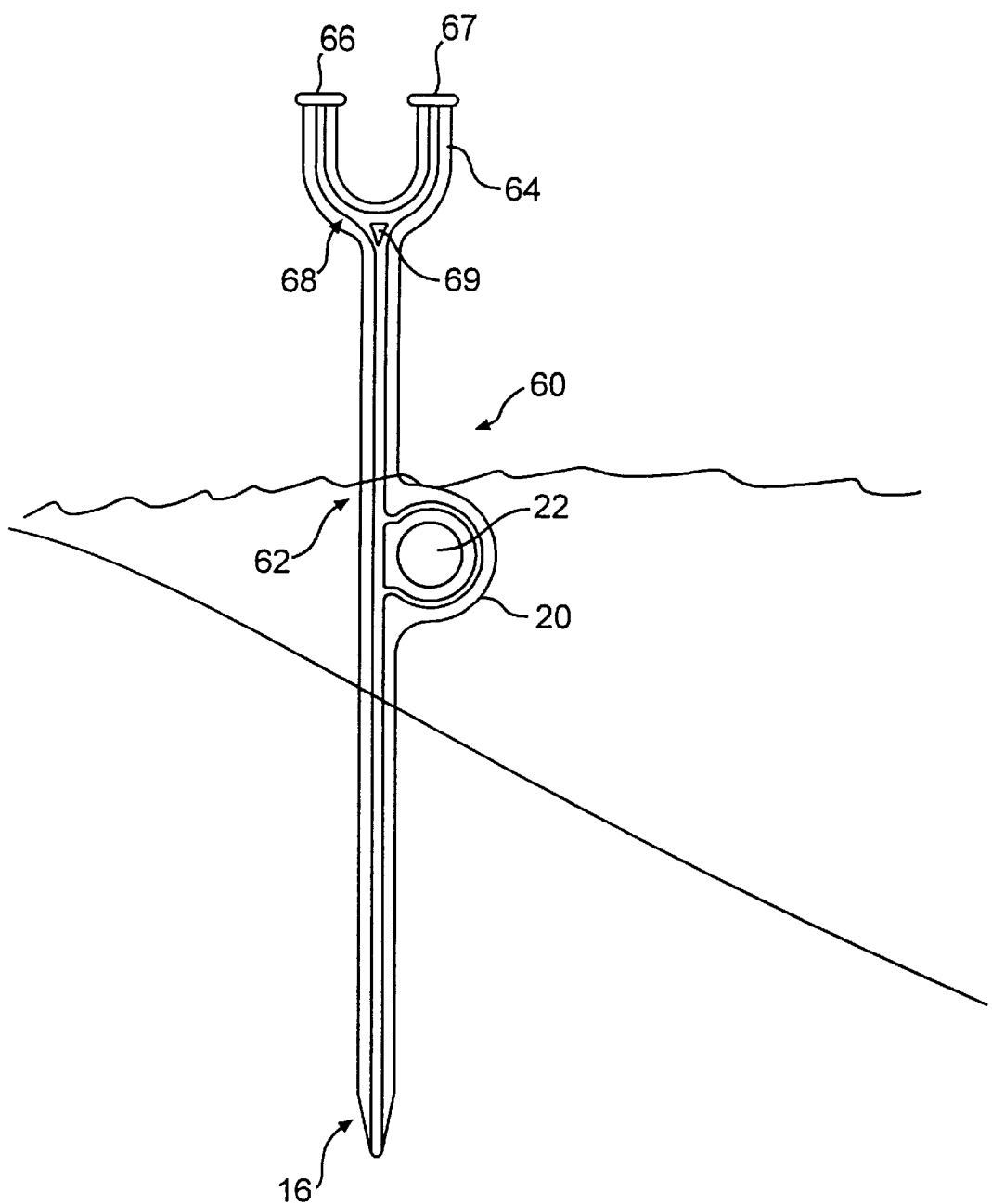
FIG. 6 is a frontal view of a fifth embodiment of a fishing device in accordance with the present invention illustrating one use near the shoreline.

FIG. 6 shows a fifth embodiment of fishing device 60 in use near the shoreline. In this embodiment, fishing rod holder 64 is mounted on top of elongated member 62 along the bight 68 section of the U-shaped fishing rod holder 64. As shown in FIG. 6, two inserting means 66 and 67 are provided on top of each of the legs of the U-shaped holder 64 for asserting additional pressure to secure fishing device 60 into the ground. Additionally, opening 69 is provided for hanging the fishing device 60 from a hook or nail as in the previous embodiments. Fishing device 60 may also be altered to move the annular member 20 into the center of the elongated member 62 as was shown and described for the embodiment in FIG. 5. The fishing holder 64 may also be more of a square shape or even a V-shape for holding the fishing rods rather than the U-shape as shown and described in this figure. The fishing device 60 is shown in this figure is inserted into the ground under the water and annular member 20 is under the surface of the water. Depending on the preference of the fisherman and the type of ground, the annular member 20 may also be above the surface of the water.

It will be apparent to those skilled in the art that various modifications and variations can be made in the embodiments of the present invention and in construction of this fishing device without departing from the scope or spirit of the invention. As an example, the annular members may be rotated 90° from the position shown in the figures, even though such a configuration is not as compact or stored as easily. Also, the annular members may also be more oval, square-like, or any other appropriate shape. The support in FIGS. 1, 4, and 6 may also be more squarely shaped or even V-shaped to hold the fishing rod.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A fishing device, comprising:

a stake extending linearly between a capped top end and a pointed bottom end, the capped top end providing a surface for applying force to the stake to drive the pointed bottom end into a supporting surface;

a U-shaped fishing rod support having one leg defined by the top end of the stake and a second leg spaced from the top end of the stake and located at or below the capped top end of the stake; and an annular member extending outwardly from a portion of the stake below the fishing rod support for supporting a string of fish;

each of the stake, the fishing rod support, and the annular member all lying in a common plane and formed having crossing, perpendicular flanges, the flanges extending between the capped top end and the pointed bottom end of the stake, and the flanges having a cross-sectional configuration such that one of the flanges lies in the common plane;

wherein a portion of the one flange lying in the common plane defines a web portion between the fishing rod holder and the annular member, the web portion having a greater width in the common plane than a remaining portion of the one flange for added rigidity of the fishing pole support and the annular member.

2. The fishing device as in claim 1, wherein the fishing rod support is spaced from the capped top end such that force may be applied to the capped top end without interference from the fishing rod support.

3. The fishing device as in claim 1, further comprising a plurality of markings spaced along the stake for measuring length.

4. The fishing device as in claim 1, further comprising means on the stake for supporting the device when not in use.

* * * * *